US011220266B2

(12) United States Patent
Schreiber et al.

(10) Patent No.: US 11,220,266 B2
(45) Date of Patent: Jan. 11, 2022

(54) METHOD FOR AT LEAST PARTIALLY UNBLOCKING A FIELD OF VIEW OF A MOTOR VEHICLE DURING LANE CHANGES

(71) Applicants: HYUNDAI MOTOR COMPANY, Seoul (KR); KIA MOTORS CORPORATION, Seoul (KR)

(72) Inventors: Michael Schreiber, Frankfurt am Main (DE); Ingmar Langer, Darmstadt (DE); Dominik Matheis, Hanau (DE); Mario Liebeck, Rüsselsheim (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 414 days.

(21) Appl. No.: 16/282,892

(22) Filed: Feb. 22, 2019

(65) Prior Publication Data
US 2020/0139974 A1     May 7, 2020

(51) Int. Cl.
*B60W 30/18*     (2012.01)
*B60W 30/095*     (2012.01)
(Continued)

(52) U.S. Cl.
CPC .. *B60W 30/18163* (2013.01); *B60W 30/0956* (2013.01); *G05D 1/0088* (2013.01);
(Continued)

(58) Field of Classification Search
CPC ....... B60W 30/18163; B60W 30/0956; B60W 2554/4048; B60W 60/00; B60W 30/09; B60W 30/12; B60W 30/16; B60W 30/18159; B60W 30/018154; G05D 1/0088; G05D 2201/0213; G05D 1/0287;
(Continued)

(56) References Cited

U.S. PATENT DOCUMENTS

| 5,521,579 A * | 5/1996 | Bernhard | B60W 30/16 340/438 |
| 8,040,253 B2 | 10/2011 | Kaller | |

(Continued)

FOREIGN PATENT DOCUMENTS

KR     101738026     5/2017

*Primary Examiner* — Angelina Shudy
(74) *Attorney, Agent, or Firm* — Lempia Summerfield Katz LLC

(57) ABSTRACT

A method for at least partially unblocking a field of view of a motor vehicle. The method includes: locating, by a sensor system of the motor vehicle, other vehicles on a present lane of the motor vehicle in at least one of a front space of the motor vehicle and a rear space of the motor vehicle; determining, by a determination unit of the motor vehicle, if at least one of the other vehicles at least partially blocks the field of view of the motor vehicle on the present lane; deciding, by a decision unit of the motor vehicle, if a driving situation requires reducing a blocking of the field of view; and communicating, by a communication device of the motor vehicle, when the blocking of the field of view is to be reduced, a request to the other vehicles at least partially blocking the field of view of the motor vehicle to maneuver within the present lane to reduce the blocking of the field of view of the motor vehicle.

15 Claims, 7 Drawing Sheets

(51) Int. Cl.
*G06K 9/00* (2006.01)
*G08G 1/16* (2006.01)
*G05D 1/00* (2006.01)

(52) U.S. Cl.
CPC ......... *G06K 9/00825* (2013.01); *G08G 1/161* (2013.01); *G08G 1/166* (2013.01); *G08G 1/167* (2013.01); *G05D 2201/0213* (2013.01)

(58) Field of Classification Search
CPC .... G06K 9/00825; G08G 1/161; G08G 1/166; G08G 1/167; G08G 1/20; G08G 1/22; B62D 15/0255; G01C 21/3658; G01C 21/3691
See application file for complete search history.

(56) References Cited

U.S. PATENT DOCUMENTS

| | | | |
|---|---|---|---|
| 8,392,064 | B2 | 3/2013 | Thrun |
| 8,798,841 | B1 | 8/2014 | Nickolaou |
| 9,392,064 | B2 | 7/2016 | Wuellner |
| 9,783,145 | B1* | 10/2017 | Konet ................... H04W 4/027 |
| 9,810,783 | B2* | 11/2017 | Fligler .................... G01S 15/04 |
| 9,842,496 | B1* | 12/2017 | Hayward ................ G08G 1/012 |
| 9,862,382 | B2* | 1/2018 | Nakamura ............ B60W 30/02 |
| 9,981,660 | B2* | 5/2018 | Damiani ................ G01S 13/931 |
| 10,062,286 | B2* | 8/2018 | Goudy ..................... G08G 1/164 |
| 10,089,874 | B2* | 10/2018 | Goudy ..................... G05D 1/0289 |
| 10,259,458 | B2* | 4/2019 | Yoo .................... B60W 30/0956 |
| 10,493,899 | B2* | 12/2019 | Solar ....................... G08G 1/161 |
| 10,554,521 | B1* | 2/2020 | Terechko .............. H04W 4/026 |
| 10,775,799 | B2* | 9/2020 | Sim ................. G08G 1/096725 |
| 10,878,702 | B2* | 12/2020 | Fukuda ............... G06K 9/00805 |
| 10,896,606 | B1* | 1/2021 | Hayes ............... G08G 1/096725 |
| 10,928,820 | B1* | 2/2021 | Tao ...................... G05D 1/0274 |
| 2009/0069974 | A1 | 3/2009 | Kawase |
| 2009/0102629 | A1 | 4/2009 | Kaller |
| 2009/0299573 | A1* | 12/2009 | Thrun .................. B62D 15/025 701/41 |
| 2010/0152963 | A1* | 6/2010 | Heckel .................. B60W 30/17 701/29.2 |
| 2012/0083960 | A1* | 4/2012 | Zhu ........................ G05D 1/0276 701/23 |
| 2012/0129843 | A1* | 5/2012 | Zhang ........................ A61P 9/10 514/218 |
| 2013/0073193 | A1* | 3/2013 | Heavey ............ G08G 1/096791 701/119 |
| 2013/0162448 | A1* | 6/2013 | Mochizuki ............. G08G 1/164 340/905 |
| 2013/0245877 | A1* | 9/2013 | Ferguson ................ G08G 1/167 701/23 |
| 2013/0301406 | A1* | 11/2013 | Sakata .................... G08G 1/162 370/229 |
| 2015/0346724 | A1* | 12/2015 | Jones ................... B60W 50/087 701/23 |
| 2016/0306357 | A1* | 10/2016 | Wieskamp ......... B62D 15/0265 |
| 2017/0329345 | A1* | 11/2017 | Prasad .............. B60W 60/0015 |
| 2018/0134217 | A1* | 5/2018 | Peterson ................ G08G 1/167 |
| 2018/0164825 | A1* | 6/2018 | Matus ................... B60W 30/00 |
| 2019/0179334 | A1* | 6/2019 | Kim ...................... G05D 1/0295 |
| 2019/0352869 | A1* | 11/2019 | Gupta ....................... E01F 9/658 |
| 2020/0114921 | A1* | 4/2020 | Simmons ............. G05D 1/0088 |
| 2020/0198122 | A1* | 6/2020 | Newman ................ B25J 9/1697 |
| 2020/0273335 | A1* | 8/2020 | Murakami ........... G05D 1/0055 |
| 2020/0364187 | A1* | 11/2020 | Tran ....................... G06Q 20/02 |
| 2021/0005082 | A1* | 1/2021 | Tsfasman ............. G08G 1/0112 |
| 2021/0027628 | A1* | 1/2021 | Pfadler ................... G08G 1/163 |
| 2021/0048825 | A1* | 2/2021 | Elvitigala ............. G05D 1/0217 |
| 2021/0086757 | A1* | 3/2021 | Sugano .............. B62D 15/0285 |
| 2021/0107523 | A1* | 4/2021 | Lacaze ................ G06K 9/00805 |
| 2021/0112425 | A1* | 4/2021 | Tran ....................... H04B 7/0695 |
| 2021/0114585 | A1* | 4/2021 | Sugano ................ B60W 30/06 |
| 2021/0148724 | A1* | 5/2021 | Bang ..................... G05D 1/0231 |
| 2021/0157332 | A1* | 5/2021 | Cox ........................ G08G 1/167 |
| 2021/0201683 | A1* | 7/2021 | van den Berg ........ G06Q 10/06 |
| 2021/0208600 | A1* | 7/2021 | Kline ................... G01C 21/3476 |
| 2021/0216072 | A1* | 7/2021 | Lacaze .................... B60R 11/04 |

\* cited by examiner

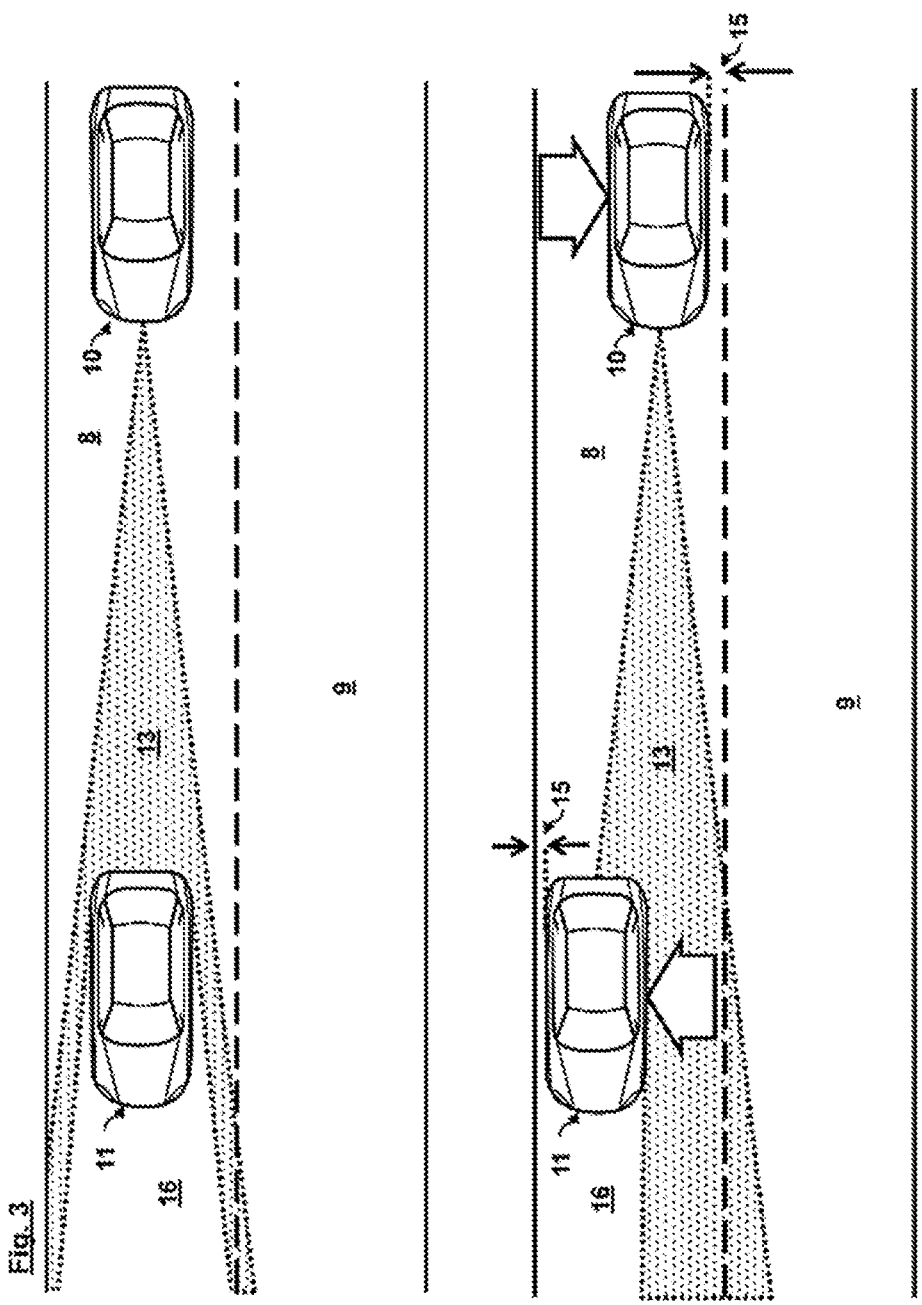

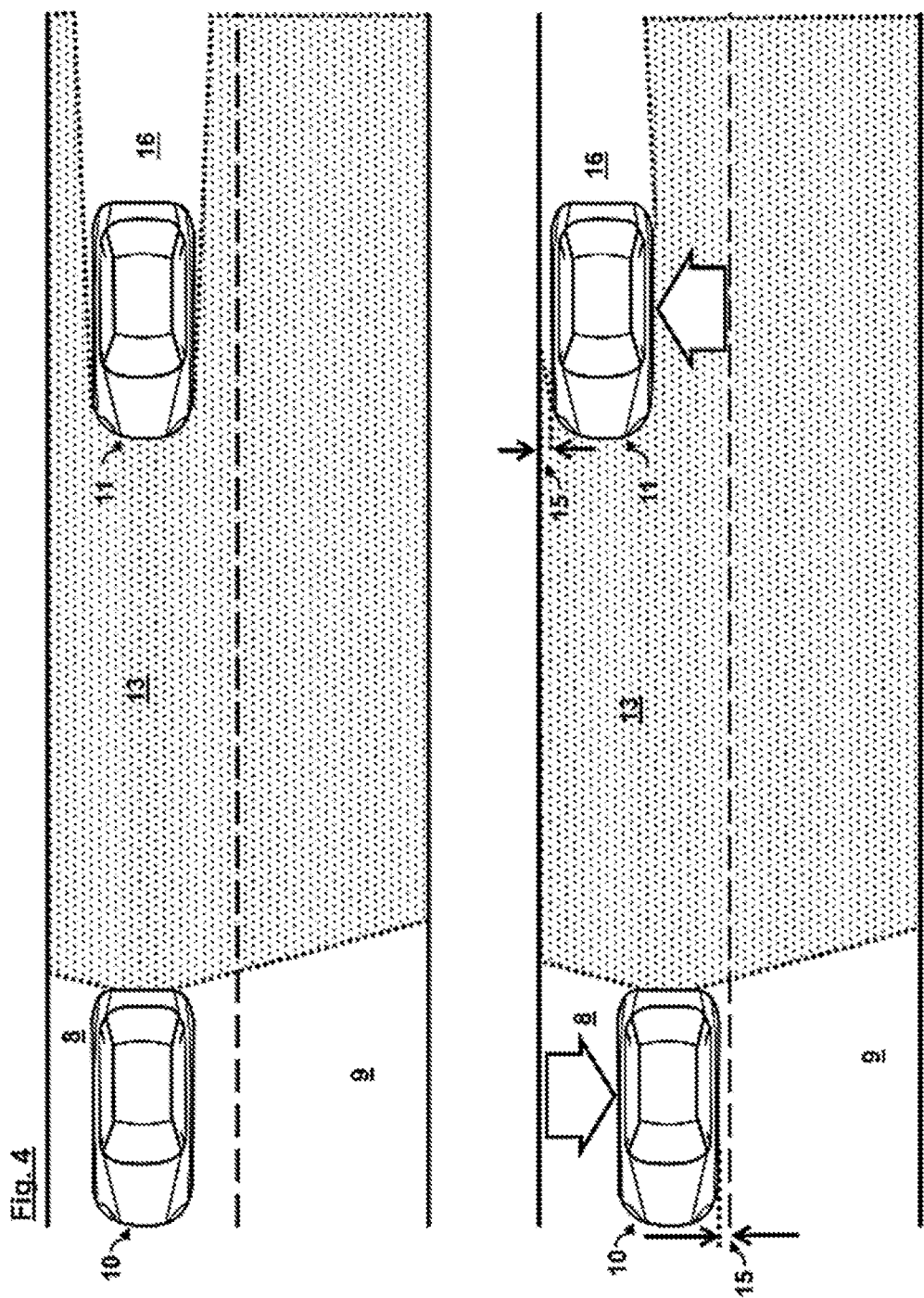

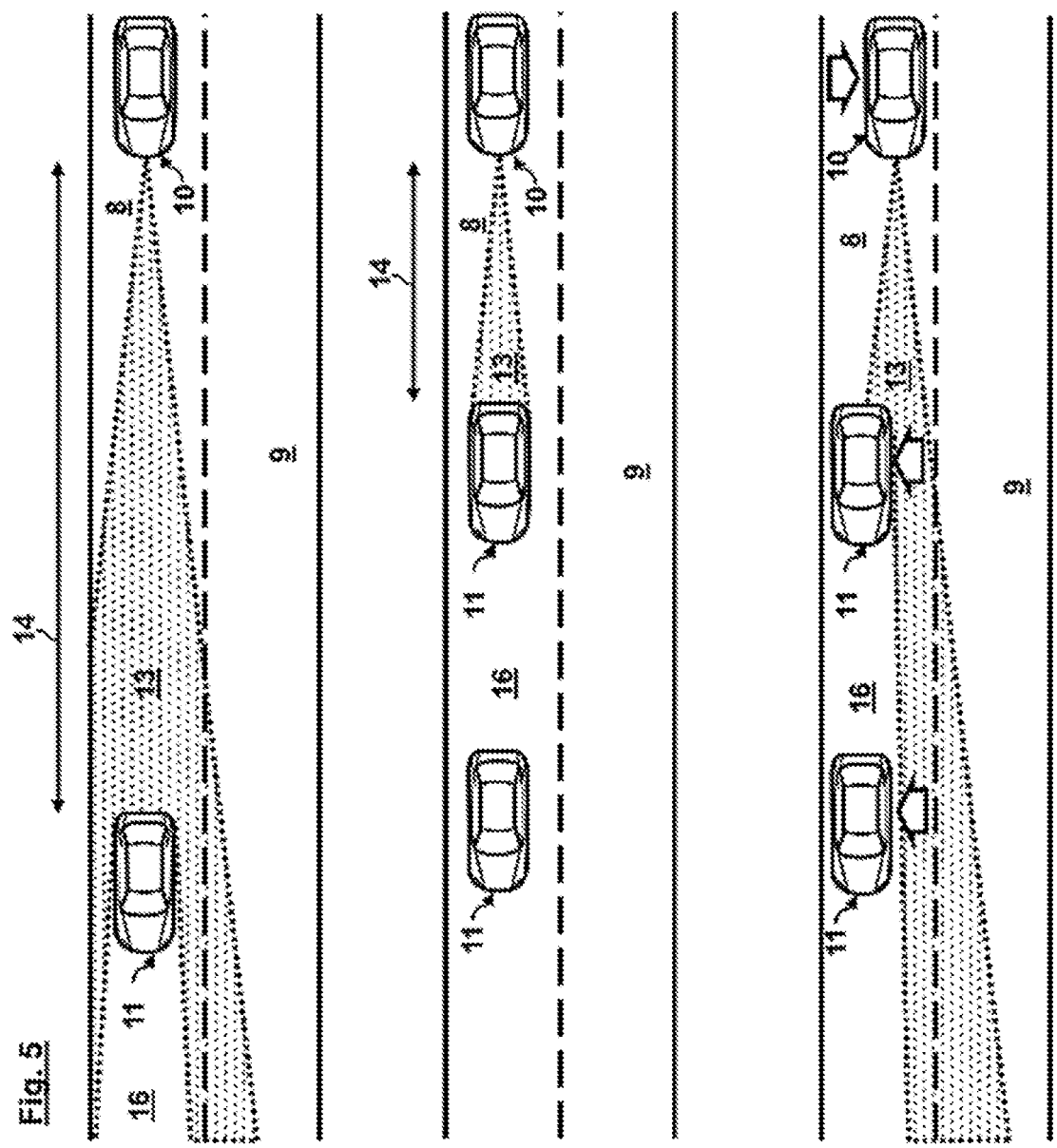

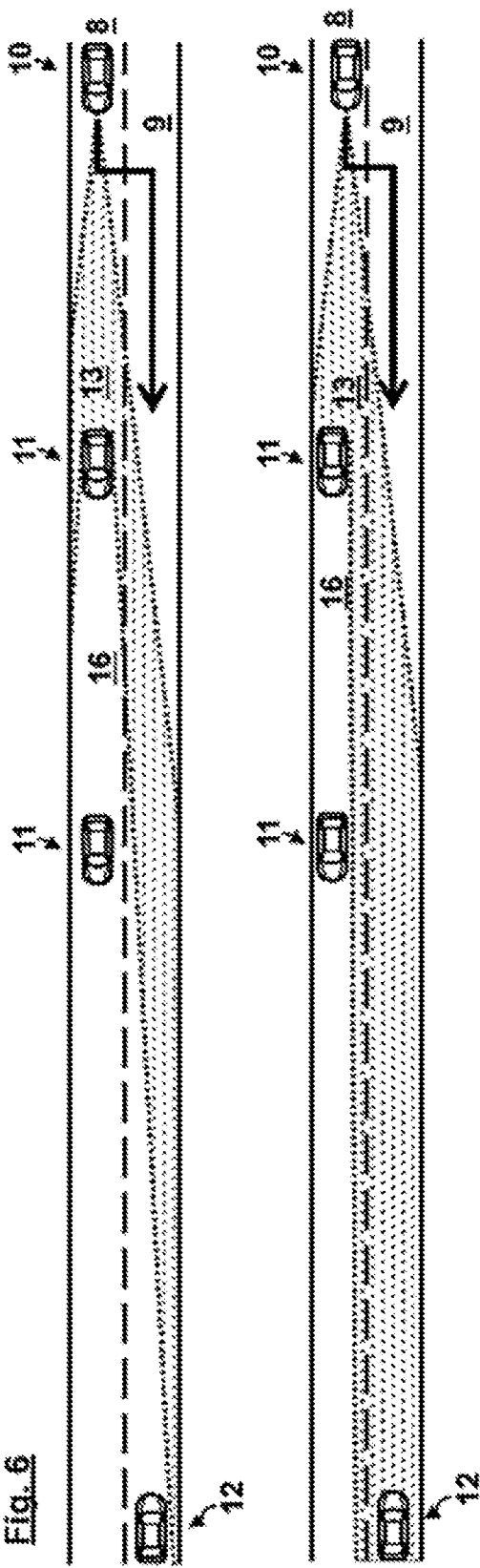

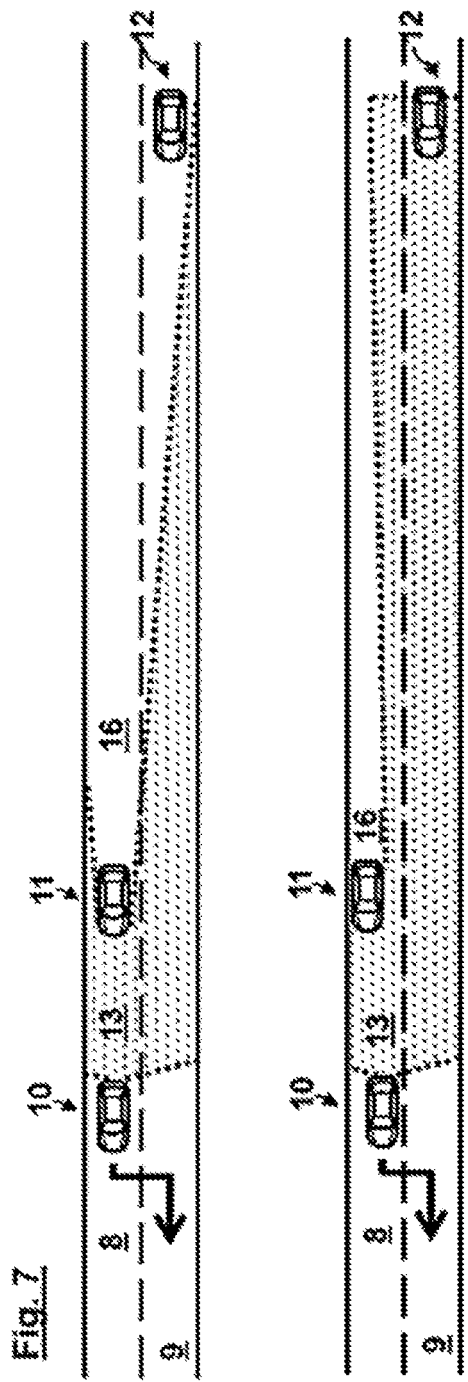

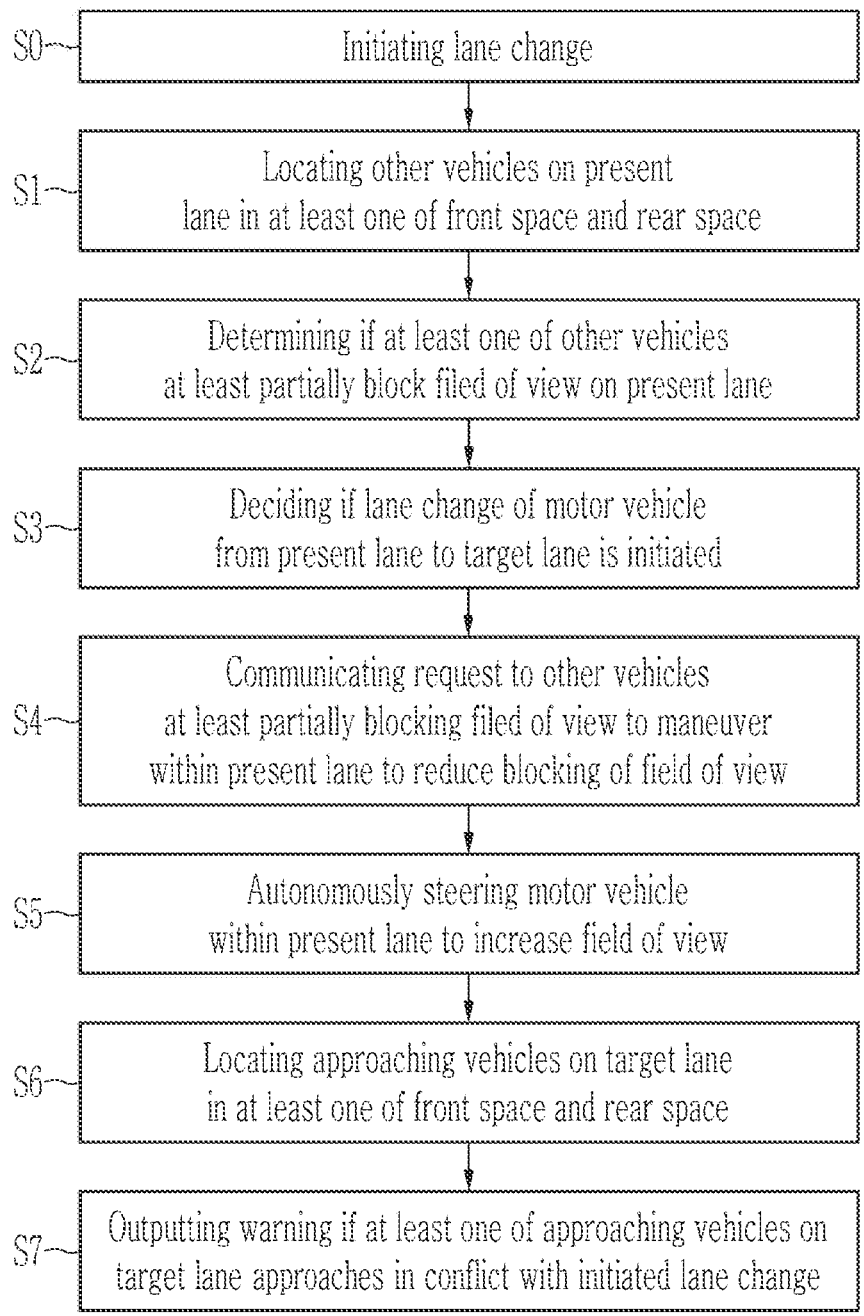

METHOD FOR AT LEAST PARTIALLY UNBLOCKING A FIELD OF VIEW OF A MOTOR VEHICLE DURING LANE CHANGES

CROSS REFERENCE TO RELATED APPLICATION

The present application claims priority to and the benefit of German Patent Application No. 102018218218835.1, filed Nov. 5, 2018, the entire contents of which are incorporated herein for all purposes by this reference.

BACKGROUND

Technical Field

The present disclosure pertains to a method for at least partially unblocking a field of view of a motor vehicle, an assistant for a motor vehicle for at least partially unblocking a field of view of the motor vehicle, and a motor vehicle with such an assistant.

Description of the Related Art

Current motor vehicles are increasingly connected with sensors and telematics in order to implement advanced driver-assistance systems (ADAS) and/or autonomous driving functionalities. For example, cars may be provided with multiple sensors and various techniques for acquiring data from the environment (e.g., to provide accurate detection of other vehicles, of the road ahead and/or behind, and the like). Typical technologies that are utilized for this purpose include radar, laser, lidar, ultrasound, cameras, stereo vision, computer vision, odometry, accelerometers, gyroscopes, GPS, and the like. A variety of such sensors may be provided on the car and information from these sensors may be combined within a sensor system to produce a more consistent, accurate, and useful view of the environment.

Vehicle sensors (e.g., front and/or rear sensors) may be blocked and/or obscured by preceding or following vehicles. During autonomous driving, it may be beneficial if cars drive close together in a column in order to save fuel. In this case, the cars are more likely to limit the sensor range of the cars nearby. This is particularly relevant for specific maneuvers, such as passing/overtaking, turning, and/or other lane changes, as the visibility of the driver and/or the ADAS/autonomous driving system may be at least partially obstructed by the preceding and following vehicles.

Document U.S. Pat. No. 8,392,064 B2 describes a variety of methods, systems, devices, and arrangements for automated assistance for a driver to facilitate maintenance of the vehicle on the lane. The vehicle is automatically steered towards a lateral offset within the vehicle lane. Steering input from the driver results in changes to this lateral offset. This modification of the lateral offset can be used to allow the driver to follow any trajectory parallel to the road, including trajectories where the vehicle is not centered within the lane.

Document U.S. Pat. No. 8,040,253 B2 discloses a lane-change assistant for motor vehicles, which includes a sensor system to locate vehicles on adjacent lanes of a directional roadway in a rear space of the motor vehicle. The assistant prevents the driver from changing to an adjacent lane if a passing vehicle is approaching from behind on this adjacent lane, such that there would be a collision risk or at least an obstruction of the passing vehicle.

SUMMARY

Hence, there is a need to find solutions for improving the field of view of ADAS sensors and/or drivers while driving.

To this end, the present disclosure provides a method in accordance with claim 1, an assistant in accordance with claim 9, and a motor vehicle in accordance with claim 17.

According to one aspect of the disclosure, a method for at least partially unblocking a field of view of a motor vehicle includes locating, by a sensor system of the motor vehicle, other vehicles on a present lane of the motor vehicle in at least one of a front space of the motor vehicle and a rear space of the motor vehicle, determining, by a determination unit of the motor vehicle, if at least one of the other vehicles at least partially blocks the field of view of the motor vehicle on the present lane, deciding, by a decision unit of the motor vehicle, if a driving situation requires reducing a blocking of the field of view, and communicating, by a communication device of the motor vehicle, when the blocking of the field of view is to be reduced, a request to the other vehicles at least partially blocking the field of view of the motor vehicle to maneuver within the present lane such as to reduce the blocking of the field of view of the motor vehicle.

According to another aspect of the disclosure, an assistant for a motor vehicle for at least partially unblocking a field of view of the motor vehicle includes a sensor system configured to locate other vehicles on a present lane of the motor vehicle in at least one of a front space of the motor vehicle and a rear space of the motor vehicle, a communication device configured to exchange information between the motor vehicle and the other vehicles, a determination unit configured to determine if at least one of the other vehicles at least partially blocks the field of view of the motor vehicle on the present lane, and a decision unit configured to decide if a driving situation requires reducing a blocking of the field of view and to communicate via the communication device, when the blocking of the field of view is to be reduced, a request to the other vehicles at least partially blocking the field of view of the motor vehicle to maneuver within the present lane to reduce the blocking of the field of view of the motor vehicle.

According to yet another aspect of the disclosure, a motor vehicle includes an assistant according to the disclosure.

One aspect of the present disclosure is to inform the other vehicles, which are preceding and/or following the present vehicle and are potentially obstructing its field of view (e.g., the field of view of a driver and/or a sensor system of the motor vehicle). For example, the other vehicles may be informed when a lane change is initiated (i.e., being in progress and/or being about to occur) and may be requested to move within their lanes in order to optimize the field of view of the present vehicle. The "receiving vehicle" of the request may check the request of the "requesting vehicle" and may either perform the movement as requested, ignore the request, or perform the request with a delay. Moreover, the receiving vehicle may return information to the requesting vehicle about the decision and/or status of performing the request. The request may contain specific instructions for the movement to be performed. Alternatively or additionally, the request may merely contain a general invitation or demand to perform a maneuver to increase the field of view of the requesting vehicle. In one particular example, a preceding and/or following vehicle may be requested to drive laterally to an outer right side of a lane while the present vehicle may simultaneously or subsequently maneuver to the left side of the lane, for example, before passing or changing to an adjacent lane on the left for other reasons. During manual or assisted driving, a driver of the requesting vehicle may be required to make the request, for example, over an input in a human machine interface. This message may then be transferred (e.g., wirelessly) to the receiving vehicle. The receiving vehicle may perform the action automatically if automated/assisted systems for lateral and/or longitudinal control are available. For non-assisted receiving cars, at least a message may be generated for the driver with the request of moving, for example, more to the left/right on the lane. For automated- or autonomous-driving systems in the requesting vehicle, the request may be automatically generated by the requesting vehicle. The request may for example be triggered by an input (e.g., a maneuver command) of the driver. The receiving vehicle may perform the action automatically if automated/assisted systems for lateral and/or longitudinal control are available. For non-assisted receiving cars, at least a message may be generated with the request. The communication may be conducted over a direct and/or indirect, in particular wireless, communication channel (e.g., a wireless car-to-car connection between requesting vehicle and receiving vehicle).

As a consequence, the field of view of a driver and/or an autonomous driving system is improved and the driver and/or the autonomous driving system is able to better assess any obstacles (e.g., backward or forward traffic) and furthermore can take improved maneuver decisions. Oncoming traffic can be detected earlier when a passing is planned, in right/left turn scenarios (e.g., at an intersection) and/or at lane changes on a freeway/highway with larger relative speeds. Backward traffic can be recognized early on. In autonomous driving applications, a reduced field of view due to shorter safety margins can be compensated and traffic flow can be optimized. Overall the visibility of the vehicle surrounding is increased for drivers (e.g., in assisted driving) and/or passengers on the driver seat in fully automated driving or self-driving vehicles. Finally, an increase of sensor/driver field of view results in higher safety.

It is understood that the terms "vehicle" or "vehicular" or other similar terms as used herein are inclusive of motor vehicles in general, such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present disclosure are found in the subordinate claims.

According to an embodiment of the disclosure, the request may contain information for the other vehicles to move laterally and/or longitudinally within the present lane relative to the motor vehicle. In one particular example, the other vehicle may be requested to move laterally to the outer right or left side of a lane. In another example, the other vehicle may be requested to increase its distance to the motor vehicle within the lane and move longitudinally within the lane relative to the motor vehicle. A person of ordinary skill in the art will be readily aware that scenarios may be possible, such that a combined lateral and longitudinal movement of the other vehicle may be beneficial. Furthermore, depending on the case at hand, additional maneuvers may be requested including but not limited to requesting a lane change of the other vehicle.

According to an embodiment of the disclosure, the other vehicles may be allowed to maneuver within safety margins on the present lane. For example, a lateral safety margin may be required to maintain with respect to the outer lateral boundaries of the present lane (e.g., several centimeters or decimeters). In this case, the other vehicle may, for example, perform a lateral movement to the left or right within the lane until the safety margin is reached. In another example, longitudinal margins may be taken into considerations (e.g., minimum safety distances).

According to an embodiment of the disclosure, the method may be used for assisting lane changes of the motor vehicle. The request may be communicated if a lane change of the motor vehicle from the present lane to a target lane is initiated. Accordingly, the assistant may be configured as a lane-change assistant. The decision unit may be configured to decide if the motor vehicle initiates a lane change from the present lane to a target lane and to communicate the request in case a lane change is initiated.

"Lane changes" within the meaning of the present disclosure relate to changing lanes in a general way. The disclosure not only relates to lane changes on roads with multiple lanes and/or to overtaking/passing maneuvers on country roads, highways, freeways, and the like, but also to turning vehicles and leaving current lanes at crossroads, intersections, on parking lots, and/or in order to enter a parking bay, and the like. However, the present disclosure can be used in a more general way to improve the field of view of a driver and/or of a sensor system of a vehicle in driving situations, which may not necessarily include a lane change. For example, when approaching a crosswalk or similar, a driver may want to improve his field of view (or that of the sensors) on the crosswalk by requesting other vehicles in the front potentially blocking the present vehicle's view on the crosswalk to move within the lane in order to unblock the view.

According to an embodiment of the disclosure, the method may include locating, by the sensor system, approaching vehicles on the target lane in at least one of the front space of the motor vehicle and the rear space of the motor vehicle. Accordingly, the sensor system may be configured to locate approaching vehicles on the target lane of the motor vehicle. Hence, the sensor system may not only be configured to detect vehicles on the present lane but also on the target lane. In more general scenarios, the sensor system may generally be configured to detect vehicles on several adjacent lanes (e.g., on roads with multiple lanes).

The method may include outputting, by a driver interface of the motor vehicle, a warning if at least one of the approaching vehicles on the target lane approaches in conflict with the initiated lane change. Correspondingly, the assistant may include a driver interface configured to output a warning if at least one of the approaching vehicles on the target lane approaches in conflict with the initiated lane change. The approaching vehicle may be oncoming from the front (e.g., in case of a passing maneuver) or catching up from the back (e.g., in case of a lane change on a highway). Accordingly, approaching obstacles may be detected and the driver and/or the autonomous driving system may apply appropriate measures.

According to an embodiment of the disclosure, the method may include outputting, by a driver interface of the motor vehicle, a request of another vehicle for the motor vehicle to maneuver within the present lane such as to reduce the blocking of the field of view of the another vehicle. Accordingly, the assistant may include a driver interface configured to output a request of another vehicle for the motor vehicle to maneuver within the present lane such as to reduce the blocking of the field of view of the another vehicle. In this embodiment, a driver-assistance function is provided that informs a driver about other vehicles requesting a movement of the present motor vehicle (e.g., because these other vehicles are about to perform a lane change). This is for example relevant for non-autonomous vehicles as a message/indication may be generated for the driver with the request of moving, for example, more to the left/right on the lane.

According to an embodiment of the disclosure, the method may include autonomously steering, by an autonomous steering unit of the motor vehicle, the motor vehicle within the present lane to increase the field of view of the motor vehicle. Accordingly, the assistant may include an autonomous steering unit configured to steer the motor vehicle within the present lane to increase the field of view of the motor vehicle. For example, the receiving vehicle may be requested to drive to the right side of the present lane by the requesting vehicle as the latter may have the intention to pass. Simultaneously or subsequently, the requesting vehicle may drive to the left side of the present lane to increase the field of view of the sensors.

According to an embodiment of the disclosure, the method may include autonomously steering, by an autonomous steering unit of the motor vehicle, to maneuver the motor vehicle according to a request of another vehicle for the motor vehicle to maneuver within the present lane. Accordingly, the assistant may include an autonomous steering unit configured to maneuver the motor vehicle according to a request of another vehicle for the motor vehicle to maneuver within the present lane. Hence, the roles of receiving vehicle and requesting vehicle may be interchanged so that a motor vehicle may request other vehicles to adjust their movement and may be instructed by other vehicles to maneuver accordingly to increase their field of view.

According to an embodiment of the disclosure, the method may include initiating a lane change by the autonomous steering unit. Accordingly, the autonomous steering unit may be configured to initiate a lane change. Hence, an autonomous driving system may automatically initiate a lane change, request other vehicles to move accordingly to increase its own field of view (e.g., to move laterally to the right side of the present lane in case of a passing maneuver) and/or adjust itself within the present lane to increase its field of view (e.g., to move laterally to the left side of the present lane), and start the actual lane change as soon as the in-lane maneuvers are finished and no approaching vehicle poses a collision risk or at least an obstruction. As soon as the lane change is over, the other vehicles may return to their original position (e.g., in the middle of the lane). The requesting vehicle may inform the other vehicles accordingly.

The disclosure will be explained in greater detail with reference to embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

FIG. 3 schematically shows a mode of operation of the assistant of FIG. 1 in case of a vehicle blocking the field of view in the front.

FIG. 4 schematically depicts a mode of operation of the assistant of FIG. 1 in case of a vehicle blocking the field of view in the back.

FIG. 5 is another schematic depiction of a mode of operation of the assistant of FIG. 1 in case of a vehicle blocking the field of view in the front.

FIG. 6 schematically depicts a passing maneuver with the assistant of FIG. 1.

FIG. 7 schematically depicts a lane change maneuver with the assistant of FIG. 1.

FIG. 8 shows a flow diagram of a method for assisting lane changes of the motor vehicle of FIG. 2 using the assistant of FIG. 1.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Figure 1:
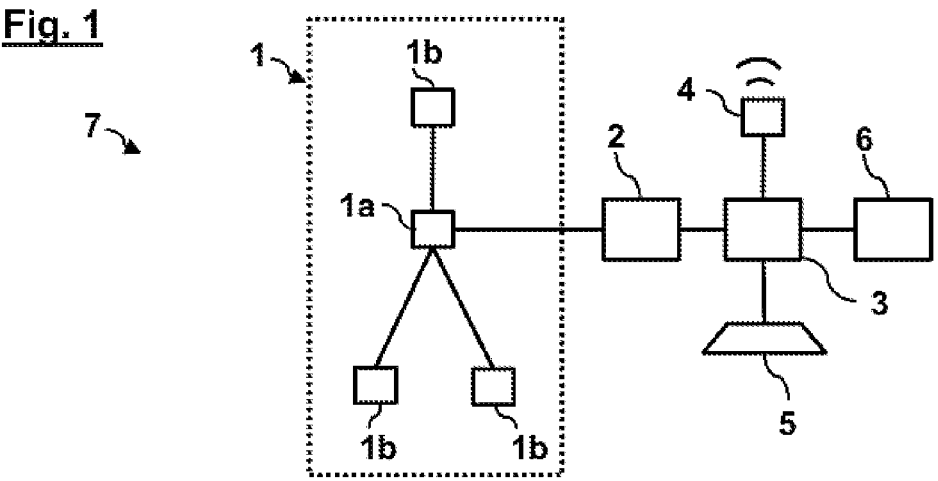
FIG. 1 schematically depicts an assistant according to an embodiment of the disclosure.
Figure 2:
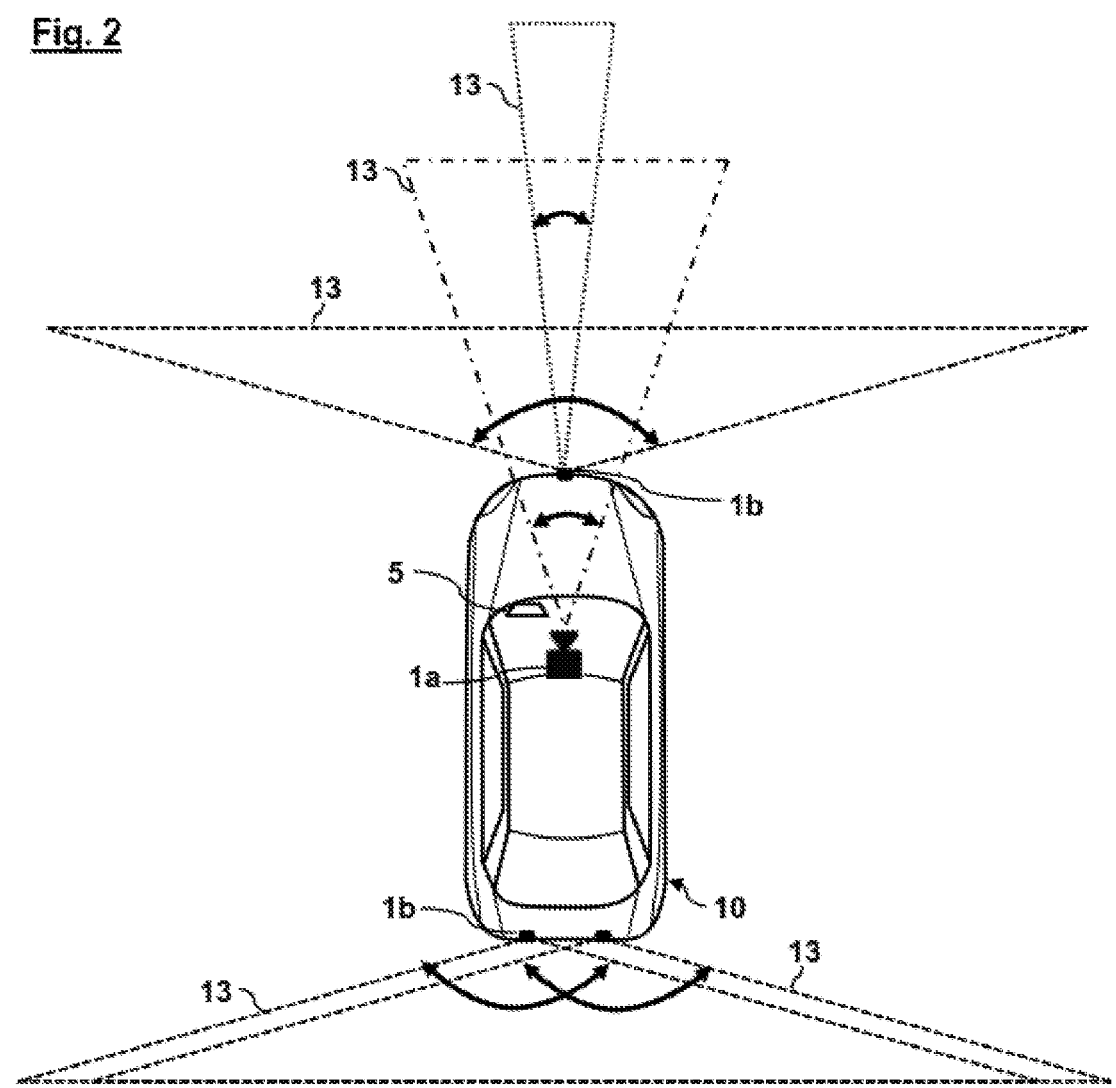
FIG. 2 schematically shows a motor vehicle including the assistant of FIG. 1.

FIG. 1 schematically depicts an assistant 7 according to an embodiment of the disclosure, which is configured as a lane-change assistant. FIG. 2 schematically shows a motor vehicle 10 including the lane-change assistant 7 of FIG. 1. The lane-change assistant 7 assists the motor vehicle 10 in changing from a present lane 8 to a target lane 9. FIGS. 3-7 demonstrate various modes of operation of the lane-change assistant 7 of FIG. 1. FIG. 8 shows a flow diagram of a method for assisting lane changes of the motor vehicle 10 of FIG. 2 using the lane-change assistant 7 of FIG. 1.

The lane-change assistant 7 includes a sensor system 1, which is configured to locate other vehicles 11 (cf. FIGS. 3 to 7) on the present lane 8 and on the target lane 9 of the motor vehicle 10 in a front space of the motor vehicle 10 and a rear space of the motor vehicle 10. The sensor system 1 may include a variety of different sensors 1a, 1b as they are utilized in modern motor vehicles, in particular in assisted and/or autonomous driving systems. The particular example of a sensor system 1 shown in FIGS. 1 and 2 includes an optical camera 1a, which provides a certain field of view 13 (dotted-dashed line in FIG. 2). The camera 1a may, for example, have a range of roughly 100 m. The field of view 13 of the camera 1a may be, for example, 40°. The sensor system 1 further includes several radars 1b, two of them in the back of the motor vehicle 10 and two of them in the front (cf. FIG. 2). In one particular example, the back radars 1b may provide a range of 200 m and a field of view 13 of 150°, while the front radars 1b may provide a range of 60 m and 120 m, respectively, as well as a field of view 13 of 20° and 150°, respectively. This means that one of the front radars 1*b* is a short range radar (as are the back radars 1*b*) and the other front radar 1*b* is a long range radar. The camera 1*a* on the other hand provides a range in-between these front radars 1*b*. However, a person of ordinary skill in the art may provide the motor vehicle 10 with other sensors 1*a*, 1*b* depending on the particular application at hand. For example, sensors with larger ranges of 300 m or 400 m and above may be utilized. Furthermore, different sensor technologies and arrangements may be employed (e.g., ultrasound sensors, lidars etc.)

The lane-change assistant 7 further includes a communication device 4, which is configured to exchange information between the motor vehicle 10 and the other vehicles 11. The communication device 4 may be particularly configured as a wireless communication device 4 providing a direct communication channel between the motor vehicle 10 and each of the other vehicles 11.

The lane-change assistant 7 further includes a determination unit 2, which is configured to determine if at least one of the other vehicles 11 at least partially blocks a field of view 13 of the motor vehicle 10 on the present lane 8. To this end, the determination unit 2 is coupled with the sensor system 1 and configured to analyze information recorded by the sensor system 1. As can be seen at the top of FIG. 3 for example, the motor vehicle 10 of FIG. 2 may be driving on present lane 8. The motor vehicle 10 may be about to pass/overtake another vehicle 11 in front and switch lanes from the present lane 8 to the target lane 9. In order to check the road ahead for any oncoming traffic, the driver and or an assisted/autonomous driving system of the motor vehicle 10 needs to be able to see as much of the road ahead as possible. However, as can be seen on FIG. 3, the other vehicle 11 partially blocks and/or obscures the field of view 13 of the motor vehicle 10 following behind, such that the sensor system 1 and/or the driver of the motor vehicle 10 cannot perceive a blocked area 16 in front of the other vehicle 11. Hence, in this case, the determination unit 2 would determine that the other vehicle 11 at least partially blocks the field of view 13 of the motor vehicle 10.

The lane-change assistant 7 further includes a decision unit 3, which is coupled with the determination unit 2 as well as the communication device 4 and is configured to decide if the motor vehicle 10 initiates a lane change from the present lane 8 to the target lane 9. Such a lane change may be initiated by a driver of the motor vehicle 10 and/or an assisted and/or autonomous driving system of the motor vehicle 10. The decision unit 3 is further configured to communicate, via the communication device 4, a request to the other vehicles 11 at least partially blocking the field of view 13 of the motor vehicle 10 to maneuver within the present lane 8, such as to reduce the blocking of the field of view 13 of the motor vehicle 10. In the examples of FIGS. 3 and 4, the motor vehicle 10 communicates to the respective other vehicle 11 to move laterally to the right side of the present lane 8 (large arrow). For reasons of safety a lateral safety margin 15 may be left between the vehicle 11 and the boundary of the present lane 8 (e.g., several decimeters). At the same time, the motor vehicle 10 moves laterally to the left on the present lane 8 to further increase the available field of view 13 and to minimize the blocked area 16. This can either be done by the driver and/or an assisted/autonomous driving system of the motor vehicle 10. In other examples, the motor vehicle 10 and the other vehicle 11 may not only move laterally but also longitudinally within the lane 8. In order to comply with safety measures, lateral safety margins as well as longitudinal safety margins may be complied with.

This procedure is particularly relevant for autonomous driving applications, in which case the motor vehicle 10 may be steered at least to some extend by an autonomous driving system and may be traveling with a reduced longitudinal safety margin in convoy with other vehicles 11 (platooning). This is demonstrated in the middle of FIG. 5 where several vehicles 10, 11 drive in convoy with reduced longitudinal safety margin 14. As can be seen here, the field of view 13 of the following motor vehicle 10 is more or less obscured by the other vehicle 11 in front. However, as soon as the vehicles 10, 11 have laterally moved as discussed above the field of view 13 of the motor vehicle 10 is significantly increased and the road ahead is again visible even though the longitudinal separation between the vehicles 10, 11 has not changed.

Both the determination unit 2 and the decision unit 3 may be part of a telematics and/or computing system of the motor vehicle 10 for assisted and/or autonomous driving. In this particular example, the lane-change assistant 7 of the motor vehicle 10 further includes an autonomous steering unit 6, which is coupled to the decision unit 3 of the motor vehicle 10 and which amongst others is configured to initiate and perform a lane change. To this end, the autonomous steering unit 6 is configured to steer the motor vehicle 10 within the present lane 8 to increase the field of view 13 of the motor vehicle 10 (e.g., the field of view 13 of the sensor system 1) before the actual lane change (e.g., by laterally moving within the present lane 8). In other embodiments however, the driver may perform this task, as was discussed above. In this case the field of view 13 may correspond to the sensor system 1 and/or the driver.

The lane-change assistant 7 further includes a driver interface 5 configured to display relevant information for the driver and to receive input from the driver (e.g., in case the driver wants to take over control of the motor vehicle 10). For example, the driver interface 5 may be configured to output a warning if a vehicle 12 approaches on the target lane 9 in conflict with the initiated lane change. The driver may be warned about any obstruction or (potential) danger of the motor vehicle 10 during the lane changing. To demonstrate this, FIG. 6 shows an example of a passing maneuver where the motor vehicle 10 tries to pass/overtake one or several vehicles 11 driving ahead of the motor vehicle 10. At first, an approaching vehicle 12 is not visible for the driver and/or the sensor system 1 of the motor vehicle 10 as it is moving within the blocked area 16 behind the other vehicles 11. Next, the motor vehicle 10 requests the other vehicles 11 to move laterally to the right side of the present lane 8 and subsequently shifts to left side of the present lane 8. The field of view 13 is accordingly increased and the approaching vehicle 12 is now visible and can be taken into account by the autonomous steering unit 6 for the passing maneuver. Additionally, the driver interface 5 may output a warning signal and/or an indication signal that one or several vehicles are approaching on the target lane 9. As soon as the passing procedure is finished (see arrow in FIG. 6), the motor vehicle 10 may send another message to the other vehicles 11 that they can return to a middle position on the lane 8.

FIG. 7 shows a similar example where the motor vehicle 10 drives on a multilane road and a vehicle 12 is approaching (e.g., with high speed) on the target lane 9 from the back. Also in this case, the approaching vehicle 12 is only visible for the motor vehicle 10 after the above described lateral movement of the other vehicle 11 blocking the field of view of the motor vehicle 10 is finished.

Accordingly, the method for assisting lane changes of the motor vehicle 10 shown on FIG. 8 includes, under S0, initiating, by the autonomous steering unit 6 of the motor vehicle 10, a lane change. The method further includes, under S1, locating, by the sensor system 1 of the motor vehicle 10, other vehicles 11 on the present lane 8 of the motor vehicle 10 in at least one of a front space of the motor vehicle 10 and a rear space of the motor vehicle 10. The method further includes, under S2, determining, by the determination unit 2 of the motor vehicle 10, if at least one of the other vehicles 11 at least partially blocks a field of view 13 of the motor vehicle 10 on the present lane 8. The method further includes, under S3, deciding, by the decision unit 3 of the motor vehicle 10, if a lane change of the motor vehicle 10 from the present lane 8 to a target lane 9 is initiated. The method further includes, under S4, communicating, by the communication device 4 of the motor vehicle 10, when a lane change is initiated, a request to the other vehicles 11 at least partially blocking the field of view 13 of the motor vehicle 10 to maneuver within the present lane 8 to reduce the blocking of the field of view 13 of the motor vehicle 10. The method further includes, under S5, autonomously steering, by the autonomous steering unit 6 of the motor vehicle 10, the motor vehicle 10 within the present lane 8 to increase the field of view 13 of the motor vehicle 10. The method further includes, under S6, locating, by the sensor system 1, approaching vehicles 12 on the target lane 9 in at least one of the front space of the motor vehicle 10 and the rear space of the motor vehicle 10. The method further includes, under S7, outputting, by the driver interface 5 of the motor vehicle 10, a warning if at least one of the approaching vehicles 12 on the target lane 9 approaches in conflict with the initiated lane change.

It will be clear to the person of ordinary skill in the art that the motor vehicle 10 may be similarly configured to receive corresponding requests from other vehicles in a case where the other vehicles would like to perform a lane change. Hence, the autonomous steering unit 6 of the motor vehicle 10 may be configured to steer the motor vehicle 10 to maneuver the motor vehicle 10 according to a request of another vehicle. In a similar vein, the driver interface 5 of the lane-change assistant 7 may be configured to output a request of another vehicle for the motor vehicle 10 to maneuver within the present lane 8 to reduce the blocking of the field of view 13 of the another vehicle.

The disclosure provides several advantages for assisted and autonomous driving:

- increase in safety as a result of increasing sensor field of view
- earlier obstacle detection (e.g., oncoming or backward traffic can be detected earlier during overtaking, turns, such as at an intersection, lane changes etc.)
- shorter safety margins in autonomous driving possible as reduced field of view is compensated
- improved maneuver decisions and traffic flow
- better visibility of relevant vehicle surrounding for the driver (in an assisted vehicle) or "passenger on driver seat" (in an automated vehicle).

In the foregoing detailed description, various features are grouped together in one or more examples or examples with the purpose of streamlining the disclosure. It is to be understood that the above description is intended to be illustrative and not restrictive. It is intended to cover all alternatives, modifications, and equivalents. Many other examples will be apparent to one of ordinary skill in the art upon reviewing the above specification.

The embodiments were chosen and described in order to best explain the principles of the disclosure and its practical applications to thereby enable others of ordinary skill in the art to best utilize the disclosure and various embodiments with various modifications as are suited to the particular use contemplated. Many other examples will be apparent to one of ordinary skill in the art upon reviewing the above specification.

REFERENCE LIST

1 sensor system
1a camera
1b radar
2 determination unit
3 decision unit
4 communication device
5 driver interface
6 autonomous steering unit
7 assistant
8 present lane
9 target lane
10 motor vehicle
11 other vehicle
12 approaching vehicle
13 field of view
14 longitudinal safety margin
15 lateral safety margin
16 blocked area
M method
M0-M7 method steps

The invention claimed is:

1. A method for at least partially unblocking a field of view of a motor vehicle, the method comprising:
    locating, by a sensor system of the motor vehicle, other vehicles on a present lane of the motor vehicle in at least one of a front space of the motor vehicle and a rear space of the motor vehicle;
    determining, by a determination unit of the motor vehicle, if at least one of the other vehicles at least partially blocks the field of view of the motor vehicle on the present lane;
    deciding, by a decision unit of the motor vehicle, if a driving situation requires reducing a blocking of the field of view;
    communicating, by a communication device of the motor vehicle, when the blocking of the field of view is to be reduced, a request to the at least one of the other vehicles at least partially blocking the field of view of the motor vehicle to maneuver within the present lane such as to reduce the blocking of the field of view of the motor vehicle; and
    autonomously steering, by an autonomous steering unit of the vehicle, the motor vehicle within the present lane to increase the field of view of the motor vehicle, to maneuver the motor vehicle according to a request of another vehicle for the motor vehicle to maneuver within the present lane, or a combination thereof.

2. The method according to claim 1, wherein the request contains information for the at least one of the other vehicles to move at least one of laterally and longitudinally within the present lane relative to the motor vehicle.

3. The method according to claim 1, wherein the at least one of the other vehicles are allowed to maneuver within safety margins on the present lane.

4. The method according to claim 1, wherein the method is used for assisting lane changes of the motor vehicle, and wherein the request is communicated if a lane change of the motor vehicle from the present lane to a target lane is initiated.

5. The method according to claim 4, further comprising: locating, by the sensor system, approaching vehicles on the target lane in at least one of the front space of the motor vehicle and the rear space of the motor vehicle; and outputting, by a driver interface of the motor vehicle, a warning if at least one of the approaching vehicles on the target lane approaches in conflict with the initiated lane change.

6. The method according to claim 1, further comprising: outputting, by a driver interface of the motor vehicle, a request of another vehicle for the motor vehicle to maneuver within the present lane to reduce the blocking of the field of view of the another vehicle.

7. The method according to claim 1, further comprising: initiating a lane change by the autonomous steering unit.

8. An assistant for a motor vehicle for at least partially unblocking a field of view of the motor vehicle, the assistant comprising:
- a sensor system configured to locate other vehicles on a present lane of the motor vehicle in at least one of a front space of the motor vehicle and a rear space of the motor vehicle;
- a communication device configured to exchange information between the motor vehicle and the other vehicles;
- a determination unit configured to determine if at least one of the other vehicles at least partially blocks the field of view of the motor vehicle on the present lane;
- a decision unit configured to decide if a driving situation requires reducing a blocking of the field of view and to communicate, via the communication device, when the blocking of the field of view is to be reduced, a request to the at least one of the other vehicles at least partially blocking the field of view of the motor vehicle to maneuver within the present lane to reduce the blocking of the field of view of the motor vehicle; and
- an autonomous steering unit configured to steer the motor vehicle within the preset lane to increase the field of view of the motor vehicle, to maneuver the motor vehicle according to a request of another vehicle for the motor vehicle to maneuver within the preset lane, or a combination thereof.

9. The assistant according to claim 8, wherein the request contains information for the at least one of the other vehicles to move at least one of laterally and longitudinally within the present lane relative to the motor vehicle.

10. The assistant according to claim 8, wherein the at least one of the other vehicles are allowed to maneuver within safety margins on the present lane.

11. The assistant according to claim 8, wherein the assistant is configured as a lane-change assistant, and wherein the decision unit is configured to decide if the motor vehicle initiates a lane change from the present lane to a target lane and to communicate the request when the lane change is initiated.

12. The assistant according to claim 11, wherein the sensor system is further configured to locate approaching vehicles on the target lane of the motor vehicle, and wherein the assistant further comprises a driver interface configured to output a warning if at least one of the approaching vehicles on the target lane approaches in conflict with the initiated lane change.

13. The assistant according to claim 8, further comprising a driver interface configured to output a request of another vehicle for the motor vehicle to maneuver within the present lane to reduce the blocking of the field of view of the another vehicle.

14. The assistant according to claim 8, wherein the autonomous steering unit is configured to initiate the lane change.

15. A motor vehicle with the assistant according to claim 8.

* * * * *

UNITED STATES PATENT AND TRADEMARK OFFICE
CERTIFICATE OF CORRECTION

PATENT NO. : 11,220,266 B2  
APPLICATION NO. : 16/282892  
DATED : January 11, 2022  
INVENTOR(S) : Michael Schreiber et al.

Page 1 of 1

It is certified that error appears in the above-identified patent and that said Letters Patent is hereby corrected as shown below:

On the Title Page

Add:  
--(30) Foreign Application Priority Data  
November 5, 2018 (DE) ......... 102018218835.1--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*